United States Patent Office 3,214,866
Patented Nov. 2, 1965

3,214,866
METHOD OF TREATING SOIL
Frank E. Halleck, Wayzata, Minn., assignor to The Pillsbury Company, Minneapolis, Minn., a corporation of Delaware
No Drawing. Filed Oct. 15, 1962, Ser. No. 230,705
5 Claims. (Cl. 47—58)

This invention relates to a novel method for treating soils by the use of a mold growth to thereby impart a bonded structure to the soil in such a manner that the soil has increased stability and will resist erosion. This is a continuation-in-part of my earlier application identified as Serial Number 109,837, filed May 15, 1961.

There has long been a need for an inexpensive method of effectively bonding large areas of soil surfaces. A method to be successful must be inexpensive in order that large areas may be covered without excessive expense. Such a binder must maintain the soil in such a condition for rather long periods of time to prevent erosion of the soil until such time as natural phenomena such as plant growth can come about to prevent erosion. This bonding of the soil must be done in such a manner as not to leave undesirable refuse on the soil and at the same time leave the soil in such condition that desirable plant life can be developed thereon.

It has long been known that various mulches can be applied to the top of soils to help prevent erosion and loss of soil moisture, however, such mulches do not impart the necessary bonding, tend to wash off and are unsatisfactory in other respects. Those mulches which are bonded with adhesive materials such as asphalt leave an undesirable refuse on the soil, are expensive, or undesirable in other respects.

It has been known that fibrous mats may be laid down but these are expensive, difficult to place and hold, and leave undesirable residue. Various mats, plastic tops and tapes have been used for depositing seed on the soil but are undesirable for many of the reasons stated above.

Soil colloids have been used to impart stability to soils but they have been short-lived and are undesirable because in some soils, particularly clay soils, they block soil porosity, resulting in run-off of water.

It is also known that the soil surface may be coated with mixtures of clay and water soluble cellulosic material but these are undesirable because of cracking, peeling and insufficient bonding. Thus it can be seen that none of the prior art teaches the solving of the problem as does the invention described herein.

The literature is prolix with methods for aggregating soil particles into pellets to improve soil tilth, porosity and aeration, but these methods are not applicable to the bonding of soil surfaces as contemplated by my invention.

An object of my invention is to provide a novel method of bonding soil surfaces.

An important object of this invention is to provide a product which when applied to the soil will cause the formation of a mold mat which will bond the soil surface and prevent erosion.

It is a further object of this invention to provide a liquid or dry mold inoculum which may be marketed separately or in combination with a nutrient medium which materials may then be added to the soil.

Another object of my invention is to provide a novel seed saver preparation which contains plant seed and which preparation may be applied to soils in such a manner as to reduce the amount of reseeding necessary.

Additional objects of my invention are to provide novel methods of seeding soil to establish plant growth.

It is still another object of my invention to provide a means of preparing a dry inoculum for use in protecting soils. Yet another object of my invention is a method of providing a liquid inoculum for use in bonding the soil surface to combat erosion.

It is also an object of my invention to provide a novel method of growing grass turf for sale on a commercial basis.

Further objects of my invention will be evident from the description herein.

Briefly my invention comprises the novel steps of growing a mold which has particular characteristics of forming a heavy mycelial growth. This mold is grown under favorable conditions so that it may be subsequently added to a carrier material such as a cellulose-like material as, for example, wheat bran. This wheat bran with the hyphae filaments and spores of the mold incorporated therein is subsequently finely divided into a powder form. This powder is then added to a larger quantity of a nutrient medium of a fibrous cellulosic plant waste material such as coarse wheat bran. This admixture is then deposited on the soil as a top dressing in a thin layer and maintained in a moist condition until such time as a mold mat forms on the surface of said soil. This mold mat is formed by the hyphae of the mold which bond the cellulose-like nutrient material to the soil, the soil particles to each other, and the nutrient material particles to each other. Thus a continuous mold mat is formed which imparts a bonded condition to the soil, which bonding renders the soil less subject to erosion by natural phenomena such as wind and rain.

A more specific example will set forth my presently preferred form of this invention although this invention has many forms and applications. I prepared my mold inoculum using the mold *Rhizopus nigricans*. This mold was grown on a peptone carbohydrate medium and transferred by spore inoculation into a carbohydrate peptone broth. The growth was conducted at 25 to 28 degrees centigrade in a flask on a rotary shaker for two to three days. When sufficient growth was obtained in the flasks, usually as pellets, the growth was homogenized in a blender for 30 to 60 seconds. This product was then sprinkled over sterilized wheat bran in flat trays. The trays had a loose layer of bran of approximately two inches in depth. The trays were covered with aluminum foil and placed in an incubator for two to three days at 25 to 28 degrees centigrade to allow dense mold growth. The bran containing the mold was then subsequently air dried by spreading in a thin layer and finally comminuted to a fine particle size. The dry powder containing the mold filaments, spores and bran constituted the dry inoculum.

The above inoculum was then admixed with wheat bran at a rate of approximately 1 lb. of inoculum to 500 lbs. of bran. This admixture was subsequently applied to the surface of a soil as a top dressing to a depth of approximately one-fourth of an inch or less. The soil was then sprinkled with water at rather infrequent intervals for the purpose of maintaining the top layer of soil in a moist condition. After about three days time a suitable mold mat had formed which mat imparted bonded characteristics to the soil surface.

Many variations are possible using my invention. I have found that it is essential to use a mold which will produce the necessary filaments of hyphae which act as the bonding agent. Molds which can be utilized are those in the Phycomycetes group. *Rhizopus oryzae, Mucor hiemalis, Mucor genevensis, Rhizopus nigricans* and *Thamnidium elegans* are examples of mold species belonging to this group. I have found that the molds in this group, either individually or in combination, will work successfully in carrying out my invention. The most desirable type of mold to be utilized for any particular land surface will depend upon the condition and nature of the soil, atmospheric and surface moisture present, and available soil nutrients that can support the growth of these molds. It is important that the particular mold or combination of molds chosen must have the ability to produce the hyphae which will act as the bonding agent for the mold mat.

Quite often it is desirable to use a liquid inoculum as opposed to a dry inoculum which has been previously described. The liquid mold inoculum was prepared by growing the mold in a suitable nutrient medium until the spores and hyphae particles numbered approximately one million per milliliter medium. This medium was then admixed with water in proportion of about 1000 ml. of medium per six gallons of water. This water dispersion of spores and hyphae can then be applied to the soil directly followed by the addition of a plant waste material, or it may be admixed with the plant waste material before such material is added to the soil, or it may be sprayed upon the plant waste material after such material has been added to the soil.

When producing a dry powder inoculum, other materials than wheat bran can be used as, for example, soybean powder, comminuted soybean plants, and various other plant waste materials that can supply nutrients to the mold. The advantage of a powder is that it may be handled in shipment and applied more uniformly under some circumstances. The dry inoculum can be added to conventional wheat bran in concentrations from one pound of inoculum per 100 pounds of bran to one pound of inoculum per 1000 pounds of bran or other nutrient material. As a general rule of thumb the amount of nutrient material required is based on the amount of nitrogen present in the material. If materials other than wheat bran are used the quantities of such other material will vary according to the nitrogen content of such material which is generally measured by the protein level. For example, if wheat straw, hay, and the like, are used as the plant waste material, it may be necessary to make additions of nitrogen in the form of ammonium nitrate, saltpeter or other similar compounds to raise the level of nitrogen available for the mold to grow upon. If the plant waste material is that from a legume plant such as soybeans, alfalfa, and the like, no nitrogen need be added. Wheat bran is an ideal plant waste material to use because of its protein to cellulose concentration.

Under conditions where organic cellulose materials are not readily available, other materials may be used as fillers in combination with the nutrient material, such as clay or sand.

The amount of cellulose or cellulose-like material which may be added to the soil as the nutrient medium ranges from a dust cover up to one-fourth inch in thickness. Thus the amount in weight ranges from about one-half ton to about six tons per acre. The amount of the material to be applied to the soil surface is, of course, dependent upon the texture and composition of the soil. A rule of thumb measure is that lesser amounts of materials are required for high organic matter soils and greater amounts in sandy or clay soils. The purpose of using a plant waste material such as wheat bran as the nutrient medium is to provide a source of nutrition for the mold. Wheat bran has a rather low and continual decomposition rate and therefore it provides a suitable source of nutrient for the mold over a period of several days. Other plant waste material such as comminuted soybean plants, ground alfalfa, and the like, are equally suitable for this purpose. These plant waste materials which I have used as the nutrient medium and which can be successfully utilized in my process are cellulosic in nature, become biologically transformed or degraded gradually, and will be generally referred to as fibrous cellulosic plant waste materials.

In many instances I have found that when using wheat bran, comminuted soybean plants, or ground alfalfa as the nutrient medium, a suitable mold mat can be formed without the addition of an inoculum containing a suitable mold. I have found that these particular materials naturally have a large number of the necessary molds present therein. Thus in instances where there is a high organic content in the soil and moisture conditions are maintained at an optimum level, a suitable mold mat can be developed, utilizing the mold spores that are naturally present in these materials. In addition, many soils have the necessary molds present therein. When these molds in the soil are provided a necessary nutrient material such as wheat bran, and moisture is kept at an optimum level, a suitable mold mat will develop. Thus it is possible in some instances to carry out my invention without the step of using a specially prepared mold inoculum.

Another important application of this invention is in use as a seed saver. Thus it is possible to seed soils in such a manner that plant growth can be established without the necessity for reseeding. This method is generally referred to as the seed saver method. Thus plant seeds can be applied to the soil at the same time as the plant waste material is applied or the seed may be first applied to the soil or subsequently added on top of the plant waste material. In any event the formation of the mold mat binds the seed to the soil and to the plant waste material applied on the soil. Thus by the bonding effect of the mold mat, plant seeds are anchored and prevented from eroding, and the need for reseeding is thereby eliminated or considerably reduced. The mold mat will develop in two to three days' time and will impart a bonded condition to the soil and thereby prevent erosion until the occurrence of such natural phenomena as plant growth come into play. In due course, the natural biological processes will decay the surface-added waste material, thereby leaving no undesirable residue.

Since it takes approximately two to three days for the mold mat to develop after application of the mold inoculum, in some cases it might be desirable to add a short-lived binder to the soil to insure protection until the mold mat develops. Examples of such binders are water expandable soil inorganic colloids and organic pulps such as colloidal gels that give tackiness for a short time only. These materials can be added as an alternative or be contained in the complete blend of all the materials utilized.

Other additions can be made to the soil in addition to the mold and plant waste nutrient such as fertilizers, weed control chemicals, plant growth stimulants, and chemicals which will inhibit the growth of undesirable soil microorganisms.

After the mold mat has formed, additional permanence can be imparted to the soil by the final spray application of a fungus fixative although this step is not necessary. Inorganic fixatives that can be used to stop mold growth are mercuric chloride solutions, copper sulfate solutions, and the like. Organic compound fixatives that may be used include formaldehyde solutions, cationic and anionic detergents and compounds, and the like. Further, the mold mat may be sprayed with shellac or paint which forms a thin layer on the mold mat. It is also possible to repeat the mold mat treatment several times, thus building up several layers of the mold mat. This has the advantage of increasing the degree of bonding for various uses such as roadways.

Another important variation of my invention is the use of this process to produce a commercial turf. I have discovered that by the use of rather heavy applications of bran followed by the other hereinbefore described steps of producing a mold mat in which grass seeds are sprouted, a thick and uniform turf quickly develops. By a simple prying operation, an operator can easily roll up the turf without tearing or splitting, which turf consists of the mold mat and about one inch of soil. This removal of the turf is not possible where the mold mat was not utilized in comparable circumstances.

Reference to more specific examples will further illustrate my invention as a soil bonding method.

*Example I*

A soil plot approximately 3 feet by 50 feet was graded evenly and overlaid with eight pounds of bran which constituted a bran cover of about 1/16 to 1/8 inch depth. The bran covering was then sprayed with six gallons of water containing spores and hyphae of *Rhizopus oryzae*. The liquid mold inoculum which was used to prepare the water spray was grown in a liquid nutrient medium, as is well known to those skilled in the art, until such time as the medium had a concentration of approximately one million spores and hyphae particles per milliliter. Then approximately 1000 milliliters of this medium was added to approximately six gallons of water. This water was then sprayed over the top of the bran surface and the bran was thereafter maintained in a moist condition. After about two days at a temperature of approximately 60 to 75 degrees Fahrenheit a good mold mycelium developed binding the bran particles and the soil. The mold was most prevalent below the surface of the bran and in the soil. A mat developed that was resistant to heavy rainfall and 20 mile per hour winds that occurred during the subsequent 15-day field trial.

*Example II*

A soil plot approximately 3 feet by 50 feet was graded evenly and overlaid with bran to a depth of approximately 1/16 to 1/8 inch. This bran had previously been inoculated with spores and hyphae of a combination of the two molds *Rhizopus nigricans* and *Rhizopus oryzae*. The inoculum was a dry preparation of spores and hyphae obtained by inoculating sterilized bran with these cultures until good growth and sporulation occurred. This bran material together with the mold growth was then air dried and finely comminuted. This finely comminuted material referred to as an inoculum was blended with wheat bran by mechanical mixing. The spore and hyphae count of the final product averaged 12,000 to 200,000 spores and hyphae particles per gram of material.

Bran in amounts of 40, 32, 16, 12, 8 and 4 pounds per plot were tested. In each case after the bran was applied the plots were thoroughly moistened by spraying. Within 24 hours mold growth was evident between the bran particles and the soil particles at all levels of bran application. After approximately 48 hours the mold growth was heaviest, producing a bonded surface that was resistant to rain and wind. It was noted that the higher levels of bran yielded better binding in the early days of growth.

*Example III*

Plots of soil similar to those in Examples 1 and 2 were treated in the same manner except that the molds *Mucor hiemalis* and *Mucor genevensis* were used. The results with respect to mold mat production were approximately the same.

*Example IV*

Plots of soil approximately 3 feet by 50 feet were overlaid with bran in amounts of 40, 32, 16, 8 and 4 pounds per plot. The bran used was wheat bran, which bran had no mold inoculum added. The plots were subsequently moistened by spraying and maintained in a moist condition by subsequent sprayings as the need arose. Mold growth was evident after 24 hours and after three days, a suitable mold mat had developed. It is to be noted that these plots had no mold inoculum added, but that the molds naturally present in the bran and the soil were induced to grow with the bran providing the necessary nutrients. The molds that were naturally present in the bran and the soil developed the necessary hyphae which formed the mold mat.

In addition to the above soil binding examples, my invention is also applicable to a seed saver used wherein the mold mat is used to help develop a plant or grass turf.

*Example V*

Plots of soil 3 feet by 50 feet were graded and prepared for seed planting. These various plots were treated by the addition thereto of wheat bran, grass seed, and mold blends in various proportions. Various proportions which were utilized and which displayed successful mold mat development and grass turf growth were:

A. 32 lbs. mill bran
   7 oz. bluegrass lawn seed
   2 oz. dry mold inoculum (3 million spores and hyphae/gram)

B. 16 lbs. mill bran
   7 oz. bluegrass lawn seed
   2 oz. mold inoculum

C. 8 lbs. mill bran
   7 oz. bluegrass lawn seed
   2 oz. mold inoculum

D. 4 lbs. mill bran
   7 oz. bluegrass lawn seed
   2 oz. mold inoculum

E. 7 oz. bluegrass lawn seed

F, G, H, I, J—same as A–E except that a highway grass seed blend (predominately containing rye grain, brome grass, and timothy seeds) was utilized in the amount of 4 oz. of seeds per plot.

All the plots were moistened by spraying after application of these blends. The moistened bran and soil were mechanically bound together by the moistening and within 24 hours pronounced mold growth was evident on all of the plots. The surface produced by this procedure was resistant to wind and rain erosion. Similar plots which had been seeded without the use of the mold mat were highly susceptible to such erosion. Germination of the grass occurred within ten to fourteen days. The grass grown in the mold mats developed uniformily whereas the grass which was grown in soils not utilizing the mold mat was less uniform and exhibited evidence of having been redistributed by wind and erosion. It was particularly noticeable that on the plots which received bran applications of eight pounds or more, locally indigenous weeds were absent while at the same time the grass growth was not inhibited. The turf on the plots which had been treated by the use of a mold mat exhibited much greater stability and uniformity of turf surface than did plots which had not been treated with the mold mat.

On those plots which had been treated with heavier applications of bran in the range of from 8 to 32 pounds it was possible to remove the turf therefrom. By a simple prying operation an operator could easily roll up the turf without tearing or splitting the turf. The turf consisted of the growing grass, the bran with the mold mat and about one inch of top soil. It was possible to remove this turf after approximately 28 to 42 days from the time of seeding.

*Example VI*

My invention has particular application on graded areas too. Several plots of 3 feet by 25 feet and having slopes of 10 to 20 degrees were overlaid with the following admixtures:

A. 8 lbs. bran
   3.5 oz. bluegrass lawn seed
   0.5 oz. inoculum

B. 6 lbs. bran
   3.5 oz. bluegrass lawn seed
   0.5 oz. inoculum

C. 4 lbs. bran
   3.5 oz. bluegrass lawn seed
   0.5 oz. inoculum

D. 2 lbs. bran
   3.5 oz. bluegrass lawn seed
   0.5 oz. inoculum

E. 3.5 oz. bluegrass lawn seed

F to J. Same as A to E, except that a highway grass seed blend was used. Two ounces of seed were utilized per plot.

The plots were then moistened by the use of spray irrigation as hereinbefore described. The mold developed on the plots within 48 hours. The grass seeds were anchored by the intertwining mold filaments and bran. Germination of the seed occurred within 10 to 14 days. Plots which had been so treated did not exhibit the washing and erosion which occurred on comparable sloping plots which had not been treated with the use of a mold mat. The mold mat treated plots showed no loss of seed or bran whereas plots which had not been so treated showed furrows, washing and uneven distribution of grass seed.

*Example VII*

Another experimental plot was treated as in Example II. After approximately two days a suitable mold mat had developed. When this mat had so developed the grass seed was then applied in a uniform manner. The grass seed became embodied in the mat within a very few hours. Thus by this method it is possible to develop a stable mat prior to the application of very expensive seed and thereby avoid seed loss.

*Example VIII*

Another experimental plot approximately 3 feet by 50 feet was evenly graded and evenly overlaid with 8 pounds of bran. The bran was then top dressed by evenly distributing an admixture of one ounce of dry mold inoculum and seven ounces of grass seed. The plot was then maintained in a moist condition as hereinbefore described. After three days a suitable mold mat developed and after about 10 to 14 days the seed had germinated.

Thus it can be seen that my invention provides a new and novel method for treating soils to impart a bonded condition thereto. In addition, I have provided a new method of seeding plants which provides advantages over the prior art. It is possible to produce grass turf on a commercial scale in less than one season's growing time. The inoculum which I have taught can be either in the liquid or powdered form. This inoculum can be applied in various manners as taught hereinbefore.

My invention provides a method for stabilizing soils for which there has long been a need. While I have given specific examples of my invention in the foregoing specifications, these examples have been given only for the purpose of further teaching the invention to those skilled in the art and may not therefore be construed as limiting the scope of the invention which also admits of other equally effective embodiments.

What I claim is:

1. The method of treating soil surfaces to control erosion comprising the steps of: applying a covering of fibrous cellulosic plant waste material selected from the group consisting of wheat bran, comminuted soybean plants, ground alfalfa and an inoculum containing a mold selected from the Phycomycetes group to the surface of the soil as a top dressing and maintaining the soil surface in a moist condition until a mold mat develops on the surface of said soil the ratio of waste to inoculum being at least about 1 part inoculum to 500 parts waste material by weight.

2. The method of treating soil surfaces to control erosion comprising the steps of: applying a covering of wheat bran and an inoculum containing a mold selected from the Phycomycetes group to the surface of the soil as a top dressing and maintaining the soil surface in a moist condition until a mold mat develops on the surface of said soil the ratio of bran to inoculum being at least about 1 part inoculum to 500 parts wheat bran by weight.

3. The method of treating soil surfaces to control erosion during establishment of a cover crop comprising the steps of: applying a mixture of plant seeds and a uniform covering of wheat bran containing a mold selected from the Phycomycetes group to the surface of the soil and maintaining the soil surface in a moist condition until a continuous mold mat develops on the surface of said soil, whereby the particles of bran, the plant seeds and the soil particles are bonded together by the mold hyphae filaments the ratio of bran to inoculum being at least about 1 part inoculum to 500 parts wheat bran by weight.

4. The method of establishing a grass turf comprising the steps of: applying grass seeds uniformly to the soil and providing thereon a uniform covering of wheat bran containing a mold selected from the Phycomycetes group, maintaining the soil surface in a moist condition until a continuous mold mat develops on the surface of said soil, whereby the particles of bran and the soil particles are bonded together by mold hyphae filaments and thereby preventing soil erosion until such time as the grass seeds have germinated and a grass turf is established the ratio of bran to inoculum being at least about 1 part inoculum to 500 parts wheat bran by weight.

5. In a process for providing a porous growth facilitating layer for the planting of seeds and for bonding the soil surface to combat erosion the steps of applying to the soil surface a layer of a cellulosic waste material selected from the group consisting of wheat bran, comminuted soybean plants and alfalfa containing a mold selected from the Phycomycetes group, next maintaining the layer of bran thus applied in a moist condition until a coherent mold mat has developed in said layer and thereafter applying seeds to the surface of the mat thus developed whereby the seeds are protected from erosion or from scattering by the wind within a few hours.

References Cited by the Examiner

UNITED STATES PATENTS

| | | | |
|---|---|---|---|
| 2,004,706 | 6/35 | Nuske | 71—26 |
| 2,867,521 | 1/59 | Jeffreys | 71—8 |
| 3,017,720 | 1/62 | Busch | 47—9 |

FOREIGN PATENTS 166,194  12/55  Australia.

OTHER REFERENCES

Organic Gardening, vol. 15, issue 6, December 1949, Emmaus, Pa., page 33.

Industrial Microbiology, Prescott and Dunn, 3rd Edition, McGraw-Hill, New York, 1959, pages 844–58.

ABRAHAM G. STONE, *Primary Examiner.*